United States Patent [19]

Worm et al.

[11] Patent Number: 5,891,965
[45] Date of Patent: Apr. 6, 1999

[54] LOW TEMPERATURE PERFLUOROETHER-CONTAINING FLUOROELASTOMERS

[75] Inventors: Allan T. Worm, North St. Paul; Miguel A. Guerra, Woodbury, both of Minn.

[73] Assignee: Dyneon LLC, Oakdale, Minn.

[21] Appl. No.: 779,297

[22] Filed: Jan. 6, 1997

[51] Int. Cl.⁶ .................................................. C08F 8/32
[52] U.S. Cl. ...................... 525/326.3; 525/340; 525/378; 525/379; 525/302; 525/384
[58] Field of Search ................................ 525/326.3, 340, 525/378, 379, 382, 384

[56] References Cited

U.S. PATENT DOCUMENTS

| | | | |
|---|---|---|---|
| 2,856,435 | 10/1958 | Lo ............................................. | 260/614 |
| 3,029,227 | 4/1962 | Robb ........................................ | 260/77.5 |
| 3,250,807 | 5/1966 | Fritz et al. ............................... | 260/535 |
| 3,392,097 | 7/1968 | Gozzo et al. ........................ | 204/159.22 |
| 3,442,942 | 5/1969 | Sianesi et al. ........................... | 260/544 |
| 3,504,411 | 4/1970 | De Corso et al. ..................... | 29/25.14 |
| 3,699,145 | 10/1972 | Sianesi et al. ........................... | 260/463 |
| 3,715,378 | 2/1973 | Sianesi et al. ........................... | 260/463 |
| 3,849,594 | 11/1974 | Justice ....................................... | 178/5.6 |
| 3,876,654 | 4/1975 | Pattison ............................... | 260/30.4 R |
| 4,206,138 | 6/1980 | England ............................... | 260/458 F |
| 4,233,421 | 11/1980 | Worm ....................................... | 525/343 |
| 4,259,463 | 3/1981 | Moggi et al. ............................. | 525/331 |
| 4,273,728 | 6/1981 | Krespan ............................... | 260/465.6 |
| 4,273,729 | 6/1981 | Krespan ............................... | 260/465.6 |
| 4,275,225 | 6/1981 | Krespan ................................... | 560/174 |
| 4,287,320 | 9/1981 | Kolb ......................................... | 525/340 |
| 4,292,449 | 9/1981 | Krespan ................................... | 568/649 |
| 4,358,559 | 11/1982 | Holcomb et al. ....................... | 524/380 |
| 4,446,270 | 5/1984 | Guenthner et al. ..................... | 524/433 |
| 4,897,457 | 1/1990 | Nakamura et al. ..................... | 526/247 |
| 4,912,171 | 3/1990 | Grootaert et al. ....................... | 525/340 |
| 5,086,123 | 2/1992 | Guenthner et al. ..................... | 525/276 |
| 5,214,106 | 5/1993 | Carlson et al. .......................... | 525/263 |
| 5,266,650 | 11/1993 | Guerra et al. ......................... | 525/326.4 |
| 5,274,159 | 12/1993 | Pellerite et al. .......................... | 556/485 |
| 5,384,374 | 1/1995 | Guerra et al. ......................... | 525/326.4 |
| 5,488,142 | 1/1996 | Fall et al. ................................. | 560/227 |
| 5,591,804 | 1/1997 | Coggio et al. ........................... | 525/276 |

FOREIGN PATENT DOCUMENTS

| | | |
|---|---|---|
| 0 154 460 A2 | 2/1984 | European Pat. Off. . |
| 0 466 340 A2 | 6/1991 | European Pat. Off. . |
| 1193122 | 5/1970 | United Kingdom . |

OTHER PUBLICATIONS

Emel'yanov, G.A., et al., "Copolymerization of Perfluorooxaalkyl Allyl Ethers", *Russian Journal of Organic Chemistry*, 30, pp. 1331–1335 (1994).

Grootaert, W.M. et al., "Fluorocarbon Elastomers", Kirk–Othmer, Encyclopedia of Chemical Technology, 8, pp. 990–1005.

Logothetis, A.L., "Chemistry of Fluorocarbon Elastomers", *Prog. Polym. Sci.*, 14, pp. 251,291, 295 (Undated).

Mohtasham, J. et al., "Sulfer Trioxidation of Acrylic Fluoro–Allyl Ethers: Synthesis of New Fluorinated Sultones and Their Derivatives", *Journal of Fluorine Chemistry*, 43, pp. 349–369 (1989).

Romack, T.J. et al., "Synthesis of Tetrafluoroethylene–Based, Nonaqueous Fluoropolymers in Supercritical Carbon Dioxide", *Macromolecules*, 28, pp. 8429–8431 (1995).

*Primary Examiner*—Bernard Lipman
*Attorney, Agent, or Firm*—James V. Lilly

[57] ABSTRACT

The present invention provides a process of curing a fluorocarbon elastomeric composition comprising: providing a mixture of a saturated elastomeric gum comprising repeating interpolymerized units derived from vinylidene fluoride and a perfluorinated ether of the formula $CF_2=CF(CF_2)_m—O—R_f$ wherein m =1–4, $R_f$ is a perfluorinated aliphatic group optionally containing O atoms, at least one crosslinking agent, and an acid acceptor; shaping the mixture; and curing the resulting shaped article.

33 Claims, No Drawings

LOW TEMPERATURE PERFLUOROETHER-CONTAINING FLUOROELASTOMERS

FIELD OF THE INVENTION

This invention relates to the preparation of fluorocarbon elastomeric materials containing perfluoroether units.

BACKGROUND OF THE INVENTION

Fluorocarbon elastomers are synthetic elastomeric polymers with a high fluorine content. See, for example, W. M. Grootaert et al., "Fluorocarbon Elastomers", Kirk-Othmer, Encyclopedia of Chemical Technology, Vol. 8, pp. 990–1005 (4th ed., John Wiley & Sons, 1993). Fluorocarbon elastomers, particularly the copolymers of vinylidene fluoride (VF2) with other ethylenically unsaturated halogenated monomers, such as $C_3F_6$ (hexafluoropropylene or HFP), have become the polymers of choice for high temperature applications, such as seals, gaskets, and linings, especially when shaped articles thereof are subject to exposure to aggressive or harsh environments, such as solvents, lubricants, and oxidizing or reducing conditions. See, for example, U.S. Pat. No. 4,912,171 (Grootaert et al.), which discloses a fluoroelastomeric polymer prepared from VF2, tetrafluoroethylene (TFE), and a copolymerizable hydrocarbon olefin.

A major drawback to many applications of shaped articles made of such fluorocarbon elastomers has been their inability to satisfactorily function at low temperatures. Typically, at temperatures only slightly below 0° C., shaped articles made from copolymers of VF2 and HFP become stiff and fail to perform satisfactorily.

Low temperature flexibility of VF2 elastomers may be improved by substituting perfluoro(alkyl vinyl ethers) for the HFP in VF2/HFP/TFE copolymers as discussed in U.S. Pat. No. 5,214,106 (Carlson et al.). However, the resulting polymers cannot be cured by the onium/bisphenol cure system disclosed in U.S. Pat. No. 4,912,171 (Grootaert et al.), without destroying the ether linkage as shown in A. L. Logothetis, Prog. Polym. Sci., 14, 251–296 (1989). Thus, there is a need for low temperature elastomeric materials that can be readily cured using the onium/bisphenol cure system or diamine cure systems.

SUMMARY OF THE INVENTION

The present invention provides a process of curing a fluorocarbon elastomeric composition comprising:
(a) providing a mixture of:
  (i) a saturated elastomeric gum comprising repeating interpolymerized units derived from:
    (A) vinylidene fluoride; and
    (B) a perfluorinated ether of the formula

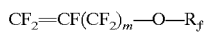

wherein: m=1–4; $R_f$ is a perfluorinated aliphatic group optionally containing O atoms;
  (ii) at least one crosslinking agent; and
  (iii) an acid acceptor;
(b) shaping the mixture; and
(c) curing the resulting shaped article.

The present invention also provides a fluorocarbon elastomeric composition comprising:
(a) a saturated elastomeric gum comprising repeating interpolymerized units derived from:
  (i) vinylidene fluoride; and
  (ii) a perfluorinated ether of the formula

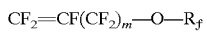

wherein: m=1–4; $R_f$ is a perfluorinated alkyl group optionally containing O atoms; and
(b) at least one crosslinking agent.

Also provided is a cured fluoroelastomer prepared from a composition comprising:
(a) a saturated elastomeric gum comprising repeating interpolymerized units derived from:
  (i) vinylidene fluoride; and
  (ii) a perfluorinated ether of the formula

wherein: m=1–4; $R_f$ is a perfluorinated alkyl group optionally containing O atoms;
(b) at least one crosslinking agent; and
(c) an acid acceptor.

Other embodiments of the present invention include articles, such as a seal, hose, and diaphragm comprising the cured fluoroelastomer described above. Also provided is a coating on a substrate, wherein the coating comprises the cured fluoroelastomer described above.

DETAILED DESCRIPTION OF THE INVENTION

The present invention relates to the preparation of fluorocarbon elastomers and their curing. The cured fluorocarbon elastomers have improved performance characteristics, such as flexibility at low temperatures. Preferably, they have a glass transition temperature (Tg) of about –20° C. or lower. More preferably, they have a Tg of about –25° C. or lower, as determined by ASTM E1356-1 (Reapproved 1995).

Specifically, the present invention provides an elastomeric composition comprising a saturated elastomeric gum comprising interpolymerized units derived from vinylidene fluoride and a perfluorinated ether of the following formula (Formula I):

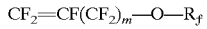

wherein m=1–4, $R_f$ is a perfluorinated aliphatic group (i.e., a monovalent saturated linear or branched aliphatic fluorocarbon group) optionally containing O atoms in the chain thereby forming additional ether linkages. Such groups containing O atoms are referred to herein as perfluoroalkyleneoxy groups. Preferably, $R_f$ contains 1–20, more preferably 1–10, and most preferably 1–4, carbon atoms.

Surprisingly, this elastomeric copolymer (i.e., elastomeric gum) can be cured (i.e., vulcanized) using a variety of cure systems containing one or more crosslinking agent(s). One particularly preferred cure system is that described in U.S. Pat. No. 4,912,171 (Goortaert et al.), which contains an organo-onium compound and a polyhydroxy compound as a crosslinking agent, without destroying the ether linkage. Thus, the elastomeric composition of the present invention further includes a combination of a polyhydroxy compound or other crosslinking agent, such as a polyamine, and preferably an organo-onium compound. In order to cure the elastomeric composition, an acid acceptor, such as calcium hydroxide or other conventional acid acceptors, is preferably included within the composition. The elastomeric composition can be shaped and cured to form an article, such as an O-ring, seal, gasket, lining, hose, diaphragm, and the like, or it can be used as a coating.

The elastomeric gum is saturated (i.e., essentially free of unsaturation) and is prepared from vinylidene fluoride ($CH_2=CF_2$) and a copolymerized perfluorinated ether of Formula I. The molar ratios of these monomers in the elastomeric gum are selected to achieve the physical properties (e.g., chemical resistance, high temperature stability, low temperature flexibility, and fuel resistance) desired in the cured polymer. Typically, the elastomeric gum (i.e., copolymer) can be prepared from about 50–98 mole-% vinylidene fluoride (VF2) and about 2–50 mole-% perfluorinated ether of Formula I. Preferably, the elastomeric gum is prepared from at least about 50 mole-% VF2 and no greater than about 50 mole-% perfluorinated ether of Formula I. More preferably, the elastomeric gum is prepared from at least about 75 mole-% VF2 and no greater than about 25 mole-% perfluorinated ether of Formula I. Other monomers can also be used, including, for example, tetrafluoroethylene and hexafluoropropene, as well as nonfluorinated monomers such as propylene, ethylene, and the like. Such elastomeric gum copolymers are known and can be prepared using known techniques such as those described in U.S. Pat. No. 4,273,728 (Krespan) and U.S. Pat. No. 4,273,729 (Krespan). Also useful in the preparation of such copolymers is the technique described in "Synthesis of Tetrafluoroethylene-based, Nonaqueous Fluoropolymers in Supercritical Carbon Dioxide", Romack, T. J., DeSiward, J. M., and Treat, T. M., *Macromolecules* 28, 8429–8431 (1995).

One class of crosslinking agents includes polyamine compounds (including diamines). Such compounds are described in U.S. Pat. No. 3,029,227 (Robb). These include carbamic group (—NHC(O)O—) containing salts of polyfunctional acyclic amines. A preferred group of such compounds have the formula YHN—R—X, wherein R is an acyclic alkylene group containing 6–15 carbon atoms, Y is hydrogen, an alkyl or an aryl group, and X is a carbamic group (—NHC(O)O—including —NHC(O)OH). A preferred diamine crosslinking agent is the hexamethylenediamine carbamate crosslinking agent available from DuPont under the trade designation "DIAK."

Another class of crosslinking agents includes polyhydroxy compounds (including diols). These include aromatic and aliphatic polyhydroxy compounds and derivatives thereof. Such agents are well-known and are described, for example, in U.S. Pat. No. 4,259,463 (Moggi et al.), U.S. Pat. No. 3,876,654 (Pattison), U.S. Pat. No. 4,912,171 (Grootaert et al.), U.S. Pat. No. 4,233,421 (Worm), and 5,384,374 (Guerra et al.). Mixtures of various polyhydroxy compounds can be used as well in curing the elastomeric gums described herein.

Suitable polyhydroxy compounds include di-, tri-, and tetrahydroxy-benzenes, naphthalenes, and anthracenes, and bisphenols of the formula $(HO)_n—C_6H_{5-n}—(A)_x—C_6H_{5-n}—(OH)_n$, wherein A is a substituted or unsubstituted divalent aliphatic, cycloaliphatic, or aromatic group of 1–13 carbon atoms, or a thio, oxy, carbonyl, sulfinyl, or sulfonyl group, n=1–2, and x=0–1. Specific aromatic polyhydroxy compounds include 4,4'-thiodiphenol, isopropylidene-bis(4-hydroxy-benzene) (i.e., bisphenol A), and hexafluoroisopropylidene-bis(4-hydroxybenzene) (i.e., bisphenol AF). Also included are aliphatic polyhydroxy compounds including fluoroaliphatic diols, such as 1,1,6,6-tetrahydrooctafluorohexanediol and others such as those described in U.S. Pat. No. 4,358,559 (Holcomb et al.). Preferred polyhydroxy compounds are aromatic polyhydroxy compounds. In addition to the above crosslinking agents, complexes of crosslinking agents with an onium as described in U.S. Pat. No. 5,591,804 or 4,912,171, included herein by reference, are also useful.

Co-curatives can be used in addition to the crosslinking agents listed above. These include, for example, the monofunctional hydroxy compounds and amides, such as the fluoroaliphatic sulfonamides disclosed in U.S. Pat. No. 5,086,123 (Guenther et al.) and the mono-functional hydroxy compounds described in Applicants' Assignee's U.S. Pat. application Ser. No. 08/493,496.

The organo-onium compound is a cure accelerator used with the polyhydroxy crosslinking agent. It is preferably admixed with the elastomeric gum and-is one that is capable of functioning as a vulcanization accelerator of the elastomeric gum. Mixtures of various organo-onium compounds can be used as well in curing the elastomeric gums described herein. Suitable organo-onium compounds are disclosed in U.S. Pat. No. 4,912,171 (Grootaert et al.), U.S. Pat. No. 4,233,421 (Worm), as well as Applicants' Assignee's U.S. Pat. application Ser. Nos. 08/576,097 and 08/520,129. These include compounds that contain at least one heteroatom (e.g., N, S, O, P).

Examples of organo-onium compounds include sulfonium compounds as well as quaternary organo-onium compounds, such as those selected from the group of ammonium, arsonium, phosphonium, stibonium, aminophosphonium (e.g., benzyl-tris(dimethylamino) phosphonium chloride), phosphorane (e.g., triarylphosphorane), and iminium compounds. Specific examples include tetrabutylammonium chloride, tetrapentylammonium chloride, tetramethylphosphonium chloride, tetrabutylphosphonium chloride, tributylbenzylphosphonium chloride, acetic acid substituted tributyl phosphonium chloride, dibutyldiphenylphosphonium chloride, tributylallylphosphonium chloride, tributyl(2-methoxy) propylphosphonium chloride, tetraphenylarsonium chloride, tetraphenylstibonium chloride, 8-benzyl-1,8-diazobicyclo [5.4.0]7-undecenium chloride, benzyltris(dimiethylamino) phosphonium chloride, bis(benzyldiphenylphosphine) iminium chloride, and 3-(1,1-dihydroperfluorooctyloxy) propyl diisobutyl benzyl phosphonium chloride (referred to herein as "Rf Onium").

A further preferred component in the composition is an acid acceptor. Acid acceptors can be inorganic or organic compounds. Organic acid acceptors include sodium stearate and magnesium oxalate. However, acid acceptors are generally inorganic bases and include magnesium oxide, lead oxide, calcium oxide, calcium hydroxide, dibasic lead phosphite, zinc oxide, barium carbonate, strontium hydroxide, calcium carbonate, etc. The preferred acid acceptors are magnesium oxide and calcium hydroxide. The acid acceptors can be used alone or in combination.

The crosslinking agent (e.g., diamines or polyhydroxy compounds) and optional organo-onium compound can be introduced to the composition in the form of finely divided solids by milling them into the elastomeric gum. Thus mixed, this composition can be stored at room temperature for extended periods, e.g., up to two or more years. Prior to curing, preferably, the acid acceptor is milled into the organo-onium-polyhydroxy-containing gum stock, after which the storage life of the stock is more limited.

The relative amounts of the crosslinking agent(s) and optional organo-onium compound(s) are present in the composition in such amounts as to provide the desired cure of the composition when mixed with the acid acceptor. Preferably, the crosslinking agent in an amount of about 0.3–10 millimoles per hundred parts rubber (mmhr), the organo-onium compound is used in an amount of about 0.1–10 mmhr, and the acid acceptor in an amount of about 0.5–40 parts per 100 parts rubber (phr). More preferably, the crosslinking agent is used in an amount of about 3.0–7.0 mmhr, the organo-onium compound is used in an amount of about 0.5–2.0 mmhr, and the acid acceptor is used in an amount of about 2–25 phr. In this context, "rubber" refers to the elastomeric copolymer (i.e., elastomeric gum).

Other additives can be included within the compositions of the present invention for various purposes. For example, diorgano sulfur oxide compounds, such as those described in U.S. Pat. No. 4,287,320 (Kolb), can be used to increase the cure rate of the composition. Representative diorgano sulfur oxides include dimethylsulfone, tetramethylenesulfone, and bis(4-chlorophenyl)sulfone.

Fillers can be mixed with the fluoroelastomer gum to improve molding characteristics and other properties. When a filler is employed, it can be added to the vulcanization recipe in amounts of up to about 100 parts per hundred parts by weight of gum, preferably between about 15 to 50 parts per hundred parts by weight of the gum. Examples of fillers which may be used are reinforcing thermal grade carbon blacks or non-black pigments of relatively low reinforcement characteristics such as clays and barytes.

The fluorocarbon elastomer composition can be compounded or mixed in one or several steps, using any of the usual rubber mixing devices such as internal mixers (e.g., Banbury mixers), roll mills, etc. For best results, the temperature of the mixture should not rise above about 120° C. During mixing it is necessary to distribute the components and additives uniformly throughout for effective cure.

The mixture is then processed and shaped, for example, by extrusion (for example in the shape of a hose or hose lining) or molding (for example, in the form of an O-ring seal). The shaped article can then be heated to cure the gum composition and form a cured elastomer article.

Pressing of the compounded mixture (i.e., press cure) is typically conducted at a temperature of about 95–230° C., preferably about 150–205° C., for a period of about 1 minute to about 15 hours, usually for about 1–10 minutes. A pressure of about 700–20,000 kPa, preferably about 3400–6800 kPa, is typically used in molding the composition. The molds first may be coated with a release agent and prebaked.

The molded vulcanizate is then usually post cured in an oven at a temperature of about 150–315° C., preferably at a temperature of about 200–260° C., for a period of about 2–50 hours or more, depending on the cross-sectional thickness of the sample. For thick sections, the temperature during the post cure is usually raised gradually from the lower limit of the range to the desired maximum temperature. The maximum temperature used is preferably about 260° C., and is held at this value for about 4 hours or more.

The invention will be further described by reference to the following detailed examples. These examples are offered to further illustrate the various specific and illustrative embodiments and techniques. It should be understood, however, that many variations and modifications may be made while remaining within the scope of the present invention.

EXAMPLES

The following examples describe the preparation and evaluation of perfluorinated elastomeric copolymer gums and cured compositions of the invention. The indicated results were obtained using the following test methods:
Test Methods Mooney viscosity was determined by ASTM 1646-94 (ML 1+10 @121° C.). Results are reported in Mooney units.

Cure Rheology Tests were run on uncured, compounded admixtures using a Monsanto Moving Die Rheometer (MDR) Model 2000 in accordance with ASTM D 5289-93a at 177° C., no preheat, 12 minute elapsed time (unless otherwise specified) and a 0.5° arc. Minimum torque ($M_L$), Maximum torque ($M_H$), i.e., highest torque attained during specified period of time when no plateau or maximum was obtained and Difference in Torque, $\Delta T$, i.e., ($M_H$–$M_L$), were reported. Also reported were: $t_S2$ (time for torque to increase 2 units above $M_L$), t'50 (time for torque to reach $M_L$+0.5 [$M_H$–$M_L$]), and t'90 (time for torque to reach $M_L$+0.9 [$M_H$–$M_L$]).

Press-cured samples (150×75×2 mm sheets, unless otherwise noted) were prepared for physical property determination by pressing at about $6.9 \times 10^3$ kPa for the indicated amount of time and temperature.

Post cure samples were prepared by placing a press-cured sample in a circulating air oven. The oven was maintained at 232° C. and the samples treated for 16 hours.

Tensile Strength at Break, Elongation at Break, and Modulus at 100% Elongation were determined using ASTM D412-75 on samples cut from a 2.0 mm sheet with ASTM Die D.

Units are reported in Mega Pascals (Mpa).

Hardness was determined using ASTM D2240.85 Method A with a Type A-2 Shore Durometer. Units are reported in points.

Retraction at Lower Temperatures (TR-10) was determined using ASTM D1329-88 (reapproved 1993). Units are reported in °C. and ethanol was used as the cooling media Compression set determined by ASTM D 395-89 Method B with 0.139 inch (3.5 mm) O-rings compressed for 70 hours at 200° C. Results are reported as %.

Tg was determined according to ASTM E1356-91 (Reapproved 1995) except that the scan rate was 20° C./minute. The midpoint is reported.
MATERIALS The following materials were used in the preparation of the examples of the invention.

"Bisphenol AF" is a polyhydroxy compound commercially available as hexafluoroisopropylidene-bis(4-hydroxybenzene) from Aldrich Chemical Co. of Milwaukee, Wis.

"DIAK #1" is the trade designation for a hexamethylenediamine carbamate crosslinking agent ($^+H_3N(CH_2)_6NHCOO^-$) and is available from DuPont, Wilmington, Del.

"Rf Onium" is a fluorinated phosphonium cure accelerator, which was made by preparing 3-(1,1-dihydroperfluorooctyloxy)propyl diisobutylphosphine (Phospine A) in a 1000 mL, 4 neck flask, equipped with an overhead stirrer, a condenser, nitrogen purge adapter, thermometer and rubber septum by charging 170 grams of a 70% solids solution in toluene (0.82 mol) of diisobutyl phosphine (DIBP), available from Cytec Industries, Inc. of Niagara Falls, N.Y. The flask assembly was placed on an adjustable lab jack so that either external heating or cooling of the reaction flask could be done. Additional toluene was-added to dilute the DIBP solution to about 50% solids. The reaction flask was purged with nitrogen for fifteen minutes and a positive stream of nitrogen was maintained through the reaction flask to minimize the oxidation of the DIBP. In a second flask, 351 grams (0.84 mol) of 1,1-dihydroperfluoro octyl allyl ether, ($CF_3(CF_2)_6CH_2O$—$CH_2$—$CH$=$CH_2$), prepared as described in Example 1 of U.S. Pat. No. 5,274,159 (Pelerite et al), was mixed with about 100 mL of toluene and 1.3 grams (8.5 mmol) of azobisisobutyronitrile (AIBN), available from Aldrich Chemical Company, Inc. The toluene solution of DIBP was warmed to about 80° C. and the allyl ether solution in the second flask was added to the warm DIBP at about 2.5 mL per minute via a syringe pump. After about 20 minutes, a noticeable exotherm was detected and the rate of allyl ether addition and external heating was adjusted so that a temperature of 80–95° C. could be maintained. After complete addition of the allyl ether solution, the reaction mixture was heated to 85° C. for an additional 2 hours to ensure complete consumption of the DIBP had occurred. When the reaction was complete as determined by $^{31}$P NMR spectroscopy ($\delta$=–40 ppm up field from external $H_3PO_4$ for the trialkyl phosphine product), the toluene solvent was removed under reduced pressure. $^1$H, $^{31}$P MNR spectroscopy confirmed the structure to be that of the desired product 3-(1,1-dihydroperfluorooctyloxy)propyl diisobutylphosphine. Then, the desired fluorinated phosphonium cure accelerator, Rf Onium, was prepared in a 200 mL airless flask equipped with a nitrogen purge inlet and a magnetic stir bar by charging 50 grams (0.085 mol) of Phosphine A [3-(1,1-dihydroperfluorooctyloxy)-propyl diisobutylphosphine] to the flask. Next, 20 mL of 2-propanol was added to the flask to dissolve Phosphine A, and 10.8 g of benzyl chloride (0.085 mol), available from Aldrich Chemical Co., was added to the phosphine solution. The resulting mixture was heated to about 50° C. for 12 hours. $^{31}$P NMR spectroscopy of the reaction mixture showed that the phosphine had been quantitatively converted to the trialkyl benzyl phosphonium halide. $^{31}$P NMR chemical shift data for the starting phosphine is at $\delta$=–40 ppm, whereas the phosphonium chemical shift is observed in the region of $\delta$=+32 ppm. The 2-propanol was removed under vacuum and the product (3-(1,1-dihydroperfluorooctyloxy)propyl diisobutyl benzyl phosphonium chloride) was dried further under vacuum for about 12 hours at 50° C. $^1$H, $^{31}$P and $^{19}$F NMR spectra confirmed the structure of the desired product.

This phosphonium chloride was complexed with 0.42 g (1.25 mmhr) of Bisphenol AF by reacting an equimolar quantity of the fluorinated phosphonium chloride with the sodium salt of Bisphenol AF (prepared as described in Example 22 of U.S. Pat. No. 4,912,171 (Grootaert et. al)). This complexed onium is what is referred to as Rf-Onium.

"F-Diol $Mg^{+2}$" is a fluorinated ether salt made by starting with a dihydro alcohol (diol) prepared as described in U.S. Pat. No. 5,266,650, then converting to a salt (compositions are listed in weight percentages unless otherwise indicated). A magnesium salt of a fluorinated ether diol of structure HO—$CH_2$—$CF_2$—$_{O-(CF2}CF_2O)_n$$CF_2$—$CH_2$—OH with a molecular weight of 1250 was made in a 1000 mL three-necked flask fitted with a mechanical stirrer, thermometer and a refluxing condenser. The flask was charged with 500 grams (0.4 mol) of the fluorinated ether diol and 259.2 g of a sodium methoxide solution of 25 wt-% sodium methoxide (1.2 mole) in methanol. The reaction mixture was stirred and heated to slight reflux for 2–3 hours. In a second flask was prepared a solution of 162.4 grams (0.8 mol) of $MgCl_2$ .$6H_2O$ in 350 mL methanol. The freshly prepared sodium dialkoxide salt in the three-necked flask was slowly poured into the second flask containing the $MgCl_2$ and methanol solution. The solution was slowly stirred for 5–6 hours at room temperature. The solution was then quenched with 1500 mL cold water and filtered to collect the solid. The collected solid was washed three times with 600 mL cold water and then dried in an oven at 60° C. overnight. A yield of 498 grams was obtained.

"$Bu_3P^+CH_2CO_2HCl^-$" is an acetic acid substituted tributyl phosphonium chloride (i.e., an acid-based onium), which was made by adding 11.3 grams (0.12 mol) of chloroacetic acid and 20.2 grams (0.10 mol) of tributyl phosphine to 100 mL of methanol. The methanol solution was then heated to 35–40° C. for 20 hours. The methanol was removed and the reaction product washed with hexane and ether to remove unreacted tributyl phosphine and chloroacetic acid.

"DYNAMAR FC-5166" is the trade designation for a rubber curative available from Dyneon LLC, St. Paul, Minn.

"PPVE" is perfluorovinyl ether.

"PPAE" is a perfluoropropoxyallyl ether ($CF_2$=$CFCF_2OC_3F_7$), which was prepared by two different methods.

"PPAE-1" was prepared by the procedure disclosed in *Copolymerization of perfluorooxcaalykl allyl ethers*. G. A. Emel'yanov, V. I. Polyanskii, V. V. Berenbilt, Russian Journal of Organic Chemistry, Vol. 30 No. 8, pages 1331 et seq., 1994.

"PPAE-2" was prepared from the alkylation of 1,4-butane diol (1.25 kg, 13.9 moles) with bromopropane (0.5 kg, 4.1 moles) by addition of 50 wt-% sodium hydroxide (1 kg, 12.6 moles NaOH) at 65° C. and heating at 130° C. for two hours. The reaction mixture was cooled and methyl ethyl ketone (0.5 kg) and a 10 wt-% brine solution (1.1 kg) was added. Top phase (1.57 kg) was further washed with an additional 10 wt-% brine solution (1.1 kg). Top phase (940 g) was vacuum distilled to yield propoxybutanol (426 g, 86% yield), b.p. 112–118° C./14mm. Acetic anhydride (460 g) was added to the alcohol at 120° C. over one hour and heated at 130° C. for an additional hour. Acetic acid and excess acetic anhydride were distilled out to yield propoxy butyrate (585 g, 95% yield). The butyrate was fluorinated in perfluoromethyl morpholine using a tubular reactor described in U.S. Pat. No. 5,488,142 (Fall). After fluorination, excess methanol was added to provide methyl- 4-perfluoropropoxybutyl acetate (604 g, 68% yield), b.p. 120–130° C. Saponification and decarboxylation was carried out by adding to the ester, sodium carbonate (23 g) and titration with sodium hydroxide (61 g) in methanol (380 g). Methanol was then removed after addition of"FC-71 FLUORINERT" electronic liquid, available from the 3M Co., St. Paul, Minn. (1.3 kg) under reduced pressure. The mixture was then heated up to 250° C. to yield perfluoropropoxyallyl ether (375 g, 75% yield), b.p. 58–62° C.

"PPBE perfluoropropoxybutenyl ether ($CF_2$=$CFCF_2CF_2OC_3F_7$) was prepared from the alkylation of 1,5-pentanediol (1 kg, 9.6 moles) with bromopropane (1.24 kg, 10.1 moles) by addition of tetrabutylammonium bromide (20 g) and 50 wt-% sodium hydroxide (0.8 kg, 10.1 moles) at 65° C. and heating at 130° C. for two hours. The reaction mixture was cooled, water was added and the product was extracted with hexane to yield propoxypentanol (1.02 kg, 73% yield). Reaction of the alcohol with excess acetic anhydride at 135° C. for two hours and distillation of acetic acid and excess acetic anhydride yielded propoxypentyrate (1.14 kg, 92% yield). The pentyrate was fluorinated in 1,1,2-trichloro-1,2,2-trifluoroethane using a tubular reactor described in U.S. Pat. No. 5,488,142 (Fall). After fluorination, excess methanol was added to provide methyl-5-perfluoropentyl acetate (1.38 kg, 81% yield), b.p. 140–154° C. Saponification of 2 moles of the ester (888 g) was carried out by titration with sodium hydroxide (81 g, 2.0 moles) in methanol (340 g) followed by vacuum oven drying gave the sodium salt (0.9 kg, 1.95 moles, 97% yield). This salt was heated to 240° C. with (1.7 kg) of "FC-71 FLUORINERT" electronic liquid, with off gassing, until the "FC-71 FLUORINERT" electronic liquid distilled over the Vigreux column. Neutralization of acid fluoride impurity with caustic was followed by distillation to yield perfluoropropoxybutenyl ether (540 g, 73% yield), b.p. 68–78° C. The structure was confirmed by $^{19}$F NMR with $C_3F_7OCF_2CF_2CF_2H$ as the main contaminant.

"PMEAE" perfluoromethloxethoxyallyl ether ($CF_2$=$CFCF_2OCF_2CF_2OCF_3$) was prepared from the alkylation of 1,4-butanediol (434 g, 4.82 moles) with 2-chloroethyl methyl ether (500 g, 5.3 moles) by addition of tetrabutylammonium bromide (102 g) and 60 wt-% potassium hydroxide (500 g, 4.5 moles) and heating at 50° C. for two hours in 1 liter glyme. Distillation after the solids were removed yielded methoxyethoxybutanol (577 g, 81% yield), b.p. 225° C. Reaction of the alcohol with excess acetic anhydride yielded methoxy-ethoxybutyrate (700 g, 94% yield). The butyrate was fluorinated in 1,1,2-trichloro-1,2,2-trifluoroethane using a tubular reactor described in U.S. Pat. No. 5,488,142 (Fall). After fluorination excess methanol was added provide methyl-4-provide methyl-4-perfluoromethoxyethoxybutyl acetate 132–142° C. Saponification was carried out by titration with sodium hydroxide (88 g, 2.2 moles) in methanol (340 g) followed by vacuum oven drying gave the sodium salt (887 g, 2.1 moles, 96% yield). This salt was heated to 240° C. with (1.6 kg) of "FC-71 FLUORINERT" electronic liquid with off gassing, until the "FC-71 FLUORINERT" electronic liquid distilled over the Vigreux column. Neutralization of acid fluoride impurity with caustic was followed by distillation to yield perfluoromethoxyethoxyallyl ether (458 g, 61% yield), b.p. 52–62° C. The structure was confirmed by $^{19}$F NMR with $CF_3OCF_2CF_2OCF_2CF_2CF_2H$ as the main contaminant.

Gum A was a copolymer of vinylidene fluoride ($VF_2$) and perfluoropropoxyallyl ether (PPAE-1) prepared in a reactor of 1.1 liter capacity equipped with a stirrer (750) rpm), devices for measuring temperature and pressure, and two-fold system of thermoregulation. To this reactor was added in succession 650 mL of aqueous solution containing 10 mmol of $Na_2S_2O_8$, 10 mmol of $NaHSO_3.CH_2.O\ H_2O$), 12.5 mmol $Na_4P_2O_7$, 16 mmol perfluoro-2,5-dimethyl-3,6-dioxanonanate of sodium, 0.19 mmol of ethylenediaminetetraacetic acid disodium salt, 0.19 mmol of $FeSO_4.(NH_4)_2SO_4.6H_2O$.

With the reactor at a temperature of 21.5° C., 18.5 g (59 mmol) of PPAE-1 was charged into reactor. Then a mixture of 70.0 g (1065 mmol) of VF2 and 79.0 g (250 mmol) of PPAE-1 was continuously charged into the reactor to maintain the pressure at the level of 0.7 MPa. After completion of the monomer input, the contents of the reactor was stirred for an additional 2 hours and 30 minutes, during which time the pressure decreased to 0.20 MPa. The overall time of the polymerization was 8 hours and 10 minutes. The polymer was coagulated with an aqueous solution of $H_2SO_4$, the volatiles were removed to recycle the unreacted monomers (22.0 g of PPAE-1 was separated), the surfactant residues were washed out first with 1M solution of $NaHCO_3$, then with demineralized water and ethanol, and dried in vacuo at 75° C. ±5° C. to a constant weight for a yield of 131 grams.

Gum B was made in a similar manner to Gum A.

Gum C was a copolymer of vinylidene fluoride ($VF_2$) and perfluoropropoxyallyl ether (PPAE-2) polymerized in a one gallon, stainless steel reactor equipped with a mechanical stirrer. The initial charge to the reactor was 2800 grams of deionized water, 9 grams of potassium phosphate dibasic, 3 grams of ammonium persulfate, and 0.6 gram of $C_8F_{17}SO_2N(C_2H_5)CH_2COOK$. The mechanical stirrer was operated at 400 rpm and the reactor was pressurized to 0.9 MPa with 52.4 grams of $VF_2$. The reactor was controlled to a temperature of 71° C. and maintained at a pressure of 0.9 MPa. Gaseous $VF_2$ was added to the pressurized reactor continuously at a rate of 3.5 grams/minute. Simultaneously, the liquid PPAE-2 was fed in through a bladder system at a rate of approximately 4.2 grams/minute. A total of 493 grams of $VF_2$ and 600 grams of PPAE-2 were added during the process.

The resulting stable latex was removed from the reactor and coagulated by adding the latex to an agitated, aqueous 2% $MgCl_2$ solution. The coagulated crumb was washed with deionized water and dried in an air circulating oven at 120° C. resulting in 950 grams of gum.

Gum D was prepared in a manner similar to Gum C except PPBE was used instead of PPAE-2. The yield was 515 grams of gum.

Gum E was a copolymer of $VF_2$ and PMEAE polymerized in a one gallon, high pressure, stainless steel reactor equipped with a mechanical stirrer. The initial charges to the reactor were 2800 grams of deionized water, 9 grams of potassium phosphate dibasic, 3 grams of ammonium persulfate, 0.7 gram of $C_8F_{17}SO_2N(C_2H_5)CH_2COOK$ emulsifier and 80 grams of PMEAE. The mechanical stirrer was operated at 400 rpm and the reactor was pressurized to 0.9 MPa with 47 grams of $VF_2$. The reactor was controlled to a temperature of 71° C. and maintained at a pressure of 0.9 MPa. Gaseous $VF_2$ was added to the pressurized reactor continuously at a rate of 3 grams/minute. Simultaneously, the liquid PMEAE was pumped into the reactor using a Milton Roy "CONSTAMETRIC" pump at a rate of 4 grams/minute. A total of 170 grams of $VF_2$ and 300 grams of PMEAE were added during the process. The resulting stable latex was removed from the reactor and coagulated by adding the latex to an agitated, aqueous, 2% $MgCl_2$ solution. The coagulated crumb was washed with deionized water and dried in an air circulating oven at 120° C. resulting in 200 grams of gum.

Gum F was made in a manner similar to Gum A except PPVE was used instead of PPAE-1.

A summary of the raw gums and the molar percentage of the various monomers is shown in Table 1.

TABLE 1

| Monomer, Mole % | Gum Identification | | | | | |
|---|---|---|---|---|---|---|
| | A | B | C | D | E | F |
| VF2 | 81.3 | 77.5 | 85 | 89 | 94 | 78 |
| PPAE-1 | 18.7 | 22.5 | | | | |
| PPAE-2 | | | 15 | | | |
| PPBE | | | | 11 | | |
| PMEAE | | | | | 6 | |
| PPVE | | | | | | 22 |
| Mooney viscosity ML 1 + 10 @ 121° C. | 113 | 30 | 112 | — | — | 123 |
| Glass Transition Temperature (Tg) °C. Mid Point | −29.5 | −31.9 | −31.1 | −31 | −37.5 | −25.6 |

Examples 1–8

In the following examples, the compositions are based on 100 parts of rubber. The curatives and other additives are listed as parts per hundred parts of the rubber (phr). Where the amount of rubber was limited and a smaller batch size was made, the quantity of rubber used is noted, but the formulation is listed as if 100 parts were used to make comparisons easier. Percentages are weight % unless otherwise indicated.

Example 1

In Example 1, a curable composition of the invention was made by compounding the following curatives and additives into Gum A using a two-roll mill and conventional techniques: 100 grams of Gum A, 2.2 grams of Bisphenol AF, 0.8 grams of "DYNAMAR" FX-5166, 30.0 grams of N-990 carbon black, available from J. M. Huber Corp., Bolger, Tex., 3.0 grams of MgO, and 6.0 grams of Ca(OH)$_2$. The cure rheology of the resulting curable composition was evaluated and the results are listed in Table 2. Press curing of the sample at 177° C. for 25 minutes gave tensile properties of 10.2 MPa, 100% modulus of 4.6 MPa, elongation of 210% and Shore A$_2$ hardness of 77. Results of physical property testing after Post-curing at 232° C. for 16 hours are also listed in Table 2.

Example 2

In Example 2, a curable composition of the invention was made and evaluated in a manner similar to Example 1 except that DIAK #1 curative was used instead of Bisphenol AF and "DYNAMAR" FX-1566.

Comparative Example C1

In Comparative Example C1, a sample was compounded and evaluated in a manner similar to Example 1 except Gum F was used instead of Gum A. The formulation and other test results are listed in Table 2.

Comparative Example C2

In Comparative Example C2, a sample was made in a manner similar to Comparative Example C1 except the DIAK #1 curative was used instead of Bisphenol AF and "DYNAMAR" FX-5166.

TABLE 2

| Example # | 1 | 2 | C1 | C2 |
|---|---|---|---|---|
| Gum A | 100 | | | |
| Gum C | | 100 | | |
| Gum F | | | 100 | 100 |
| Bisphenol AF (phr) | 2.2 | | 2.2 | |
| "DYNAMAR" FX-5166 (phr) | 0.8 | | 0.8 | |
| Diak #1 (phr) | | 1.5 | | 2.0 |
| N-990 Carbon Black (phr) | 30 | 30 | 30 | 30 |
| Ca(OH)$_2$ (phr) | 6 | | 6 | 6 |
| MgO (phr) | 3 | 15 | 3 | 15 |
| MDR @ 177° C., 0.5° Arc, 100 cpm | | | | |
| MDR Total Time (minutes) | 30 | 60 | 30 | 30 |
| M$_L$, dNm | 0.2 | 0.4 | 0.7 | 0.1 |
| M$_H$, dNm | 16.6 | 5.8 | 2.5 | 0.2 |
| ΔT, dNm | 16.4 | 5.4 | 1.8 | 0.1 |
| t$_s$2, (minutes) | 1.8 | 2.5 | — | — |
| t'50, (minutes) | 4.6 | 3.0 | 1.5 | 2.2 |
| t'90, (minutes) | 17.1 | 14.4 | 8.9 | 11.6 |
| Physical Properties after Post Cure | | | | |
| Tensile (MPa) | 12.9 | 9.1 | * | * |
| 100% Modulus (MPa) | 6.1 | 3.9 | * | * |
| Elongation (%) | 150 | 175 | * | * |
| Shore A2 Hardness | 67 | 68 | * | * |
| Compression Set, Method B, O-rings | | | | |
| 70 hrs @ 200° C., % | 35 | — | * | * |
| TR-10, °C. | −28 | — | * | * |

*Physical property results were not measurable on the Comparative Examples C1 and C2 because excessive outgassing during the press-cure step damaged the samples.

The results in Table 2 show that useful, cured samples may be made using the compositions of the invention

Example 3

In Example 3, a curable composition of the invention was made and evaluated in a manner similar to Example 1 except 50 grams of Gum B was used instead of the 100 g of Gum A. The additive and curative levels and test results were as shown in Table 3 and are listed as parts per one hundred parts of gum.

Example 4

In Example 4, a curable composition of the invention was made and evaluated in a manner similar to Example 3 except 8.7 grams of the F-Diol Mg$^{+2}$ salt and 0.2 gram of Bu$_3$P$^+$ CH$_2$CO$_2$HCl$^-$ onium were used instead of Bisphenol AF and "DYNAMAR" FX-5166. The press-cure was done at 177° C. for 30 minutes and the post-cure at 177° C. for 2.5 hours, then 232° C. for 16 hours. A Tg of −31.5° C. was measured on the sample. The formulation (based on 100 parts of gum) and test results are listed in Table 3.

Examples 5–8

In Examples 5–8, curable compositions of the invention were made in a manner similar to Example 1 except the gums, curatives and additive quantities are as shown in Table 3. Evaluation of these examples was done in a manner similar to Example 1 and the results are also shown in Table 3.

TABLE 3

| Example # | 3 | 4 | 5 | 6 | 7 | 8 |
|---|---|---|---|---|---|---|
| Gum B | 100 | 100 | | | | |
| Gum C | | | 100 | 100 | | |
| Gum D | | | | | 100 | |
| Gum E | | | | | | 100 |
| Bisphenol AF (phr) | 2.2 | | 1.5 | 1.1 | 2.0 | 2.0 |
| "DYNAMAR" FX-5166 (phr) | 0.8 | | 0.8 | | 1.0 | 1.0 |

TABLE 3-continued

| Example # | 3 | 4 | 5 | 6 | 7 | 8 |
|---|---|---|---|---|---|---|
| F-Diol $Mg^{+2}$ Salt (phr) |  | 17.4 |  |  |  |  |
| Rf Onium (phr) |  |  |  | 1.2 |  |  |
| $Bu_3P^+CH_2CO_2HCl$ (phr) |  | 0.4 |  |  |  |  |
| N-990 Carbon Black (phr) | 30 | 30 | 30 | 30 | 30 | 30 |
| $Ca(OH)_2$(phr) | 6 | 6 | 6 | 6 | 6 | 6 |
| MgO (phr) | 3 | 3 | 3 | 3 | 3 | 3 |
| MDR @ 177° C., 0.5° Arc, 100 cpm |  |  |  |  |  |  |
| MDR Total Time (minutes) | 30 | 30 | 60 | 60 | 12 | 12 |
| $M_L$, dNm | 0.2 | 0.3 | 0.2 | 0.6 | 0.2 | 1.4 |
| $M_H$, dNm | 12.5 | 7.3 | 7.8 | 13.9 | 15.6 | 17.7 |
| ΔT, dNm | 12.3 | 7.0 | 7.6 | 13.3 | 15.4 | 16.3 |
| $t_s2$ (minutes) | 3.3 | 6.6 | 5.4 | 4.4 | 1.3 | 0.7 |
| t'50 (minutes) | 7.5 | 6.9 | 9.4 | 10.9 | 1.8 | 1.0 |
| t'90 (minutes) | 20.3 | 24.8 | 39.1 | 35.6 | 4.8 | 2.4 |
| Physical Properties after Post Cure |  |  |  |  |  |  |
| Tensile (MPa) | 10.7 | 10.8 | 13.7 | 15.6 | — | — |
| 100% Modulus (MPa) | 6.8 | 7.2 | 5.1 | 6.7 | — | — |
| Elongation (%) | 145 | 145 | 190 | 170 | — | — |
| Shore A2 Hardness | 76 | 76 | 68 | 69 | — | — |
| Compression Set, Method B, O-rings |  |  |  |  |  |  |
| 70 hrs @ 200° C., % | 35 | 40 | — | 32 | — | — |
| TR-10, °C. | −26 | −32 | — | −28 | — | — |

The results in Table 3 show that useful, cured samples may be made using the compositions of the invention.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A process of curing a fluorocarbon elastomeric composition comprising:
    (a) providing a mixture of:
        (i) a saturated elastomeric gum comprising repeating interpolymerized units derived from:
            (A) vinylidene fluoride; and
            (B) a perfluorinated ether of the formula $CF_2=CF(CF_2)_m-O-R_f$ 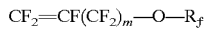

wherein: m=1–4; $R_f$ is a perfluorinated aliphatic group optionally containing O atoms;
        (ii) at least one crosslinking agent; and
        (iii) an acid acceptor;
    (b) shaping the mixture; and
    (c) curing the resulting shaped article.

2. The process of claim 1 wherein the mixture further includes an organo-onium compound.

3. The process of claim 1 wherein the mixture further comprises a diorgano sulfur oxide compound.

4. The process of claim 1 wherein the crosslinking agent is selected from the group of a polyhydroxy compound and a polyamine compound.

5. The process of claim 4 wherein the crosslinking agent is a polyhydroxy compound.

6. The process of claim 5 wherein the polyhydroxy compound is an aromatic polyhydroxy compound.

7. The process of claim 6 wherein the aromatic polyhydroxy compound is of the formula $(HO)_n-C_6H_{5-n}-(A)_x-C_6H_{5-n}-(OH)_n$, wherein A is a substituted or unsubstituted divalent aliphatic, cycloaliphatic, or aromatic group of 1–13 carbon atoms, or a thio, oxy, carbonyl, sulfinyl, or sulfonyl group, n=1–2, and x=0–1.

8. The process of claim 6 wherein the aromatic polyhydroxy compound is isopropylidene-bis(4-hydroxy-benzene) or hexafluoroisopropylidene-bis(4-hydroxybenzene).

9. The process of claim 1 wherein the elastomeric gum is derived from about 50–98 mole-% vinylidene fluoride and about 2–50 mole-% perfluorinated ether of Formula I.

10. The process of claim 1 wherein the elastomeric gum is derived from at least about 50 mole-% vinylidene fluoride and no greater than about 50 mole-% perfluorinated ether of Formula I.

11. The process of claim 1 wherein the elastomeric gum is derived from fluorinated or nonfluorinated monomers other than vinylidene fluoride in addition to vinylidene fluoride.

12. A cured fluoroelastomer prepared by the process of claim 1.

13. A cured fluoroelastomer prepared by the process of claim 10.

14. A fluorocarbon elastomeric composition comprising:
    (a) a saturated elastomeric gum comprising repeating interpolymerized units derived from:
        (i) vinylidene fluoride; and
        (ii) a perfluorinated ether of the formula $CF_2=CF(CF_2)_m-O-R_f$ 

wherein: m=1–4; $R_f$ is a perfluorinated aliphatic group optionally containing O atoms; and
    (b) at least one crosslinking agent.

15. The fluorocarbon elastomeric composition of claim 14 further comprising an organo-onium compound.

16. The composition of claim 14 further comprising an acid acceptor.

17. The composition of claim 14 further comprising a diorgano sulfur oxide compound.

18. The composition of claim 14 wherein the crosslinking agent is selected from the group of a polyhydroxy compound and a polyamine compound.

19. The composition of claim 14 wherein the crosslinking agent is a polyhydroxy compound.

20. The composition of claim 19 wherein the polyhydroxy compound is an aromatic polyhydroxy compound.

21. The composition of claim 20 wherein the aromatic polyhydroxy compound is isopropylidene-bis(4-hydroxybenzene) or hexafluoroisopropylidene-bis(4-hydroxybenzene).

22. The composition of claim 14 wherein the elastomeric gum is derived from about 50–98 mole-% vinylidene fluoride and about 2–50 mole-% perfluorinated ether of Formula I.

23. The composition of claim 14 wherein the elastomeric gum is derived from at least about 50 mole-% vinylidene fluoride and no greater than about 50 mole-% perfluorinated ether of Formula I.

24. The composition of claim 14 wherein the elastomeric gum is derived from fluorinated or nonfluorinated monomers other than vinylidene fluoride in addition to vinylidene fluoride.

25. A cured fluoroelastomer prepared from a composition comprising:
   (a) a saturated elastomeric gum comprising repeating interpolymerized units derived from:
      (i) vinylidene fluoride; and
      (ii) a perfluorinated ether of the formula $CF_2=CF(CF_2)_m-O-R_f$ 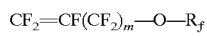

wherein: m=1–4; $R_f$ is a perfluorinated aliphatic group optionally containing O atoms;

(b) at least one crosslinking agent; and
   (c) an acid acceptor.

26. The cured fluoroelastomer of claim 25 wherein the composition further comprises an organo-onium compound.

27. The cured fluoroelastomer of claim 25 wherein the composition further comprises a diorgano sulfur oxide compound.

28. The cured fluoroelastomer of claim 25 wherein the crosslinking agent is selected from the group of a polyhydroxy compound and a polyamine compound.

29. The cured fluoroelastomer of claim 28 wherein the crosslinking agent is a polyhydroxy compound.

30. The cured fluoroelastomer of claim 29 wherein the polyhydroxy compound is an aromatic polyhydroxy compound.

31. The cured fluoroelastomer of claim 25 wherein the elastomeric gum is derived from about 50–98 mole-% vinylidene fluoride and about 2–50 mole-% perfluorinated ether of Formula I.

32. The cured fluoroelastomer of claim 25 having a Tg of less than about −20° C.

33. The cured fluoroelastomer of claim 25 wherein the elastomeric gum is derived from fluorinated or nonfluorinated monomers other than vinylidene fluoride in addition to vinylidene fluoride.

* * * * *